(12) United States Patent  
Piantoni et al.

(10) Patent No.: US 6,256,853 B1
(45) Date of Patent: Jul. 10, 2001

(54) CRIMPING DIE EMPLOYING POWERED CHUCK

(75) Inventors: Raymond W. Piantoni, Pownal, VT (US); Robert E. Ray, Jr., Strongsville, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/495,528

(22) Filed: Jan. 31, 2000

(51) Int. Cl.⁷ .............................. B23P 11/00; B21D 39/00
(52) U.S. Cl. ................... 29/243.5; 29/283.5; 29/623.1; 72/357
(58) Field of Search ................ 72/357, 396, 397, 72/402; 29/243.517, 243.58, 243.5, 283.5, 623.1; 429/171

(56) References Cited

U.S. PATENT DOCUMENTS

| 1,844,616 | 2/1932 | Whiton . | |
|---|---|---|---|
| 1,895,401 | 1/1933 | Simonsen et al. . | |
| 2,473,673 | * 6/1949 | Bell . | |
| 2,663,205 | * 12/1953 | Allen . | |
| 2,755,839 | * 7/1956 | Garrock | 72/357 |
| 3,604,240 | 9/1971 | Weyhmüller et al. | 72/345 |
| 3,837,206 | 9/1974 | Michalko | 72/348 |
| 3,911,719 | 10/1975 | Degenhardt et al. | 72/345 |
| 4,096,728 | 6/1978 | Glecker et al. | 72/345 |
| 4,197,757 | 4/1980 | Hackett | 72/462 |
| 4,207,812 | 6/1980 | Morris . | |
| 4,418,458 | * 12/1983 | Hunter | 29/243.52 |
| 4,442,184 | 4/1984 | Spanur | 429/173 |
| 4,457,156 | * 7/1984 | Vamamura | 72/357 |
| 4,466,266 | * 8/1984 | Gardner | 72/357 |
| 4,513,600 | 4/1985 | Grow et al. | 72/352 |
| 4,546,988 | 10/1985 | Gailey . | |
| 4,610,155 | 9/1986 | Langford et al. | 72/353 |
| 4,655,071 | 4/1987 | Allweier et al. | 72/346 |
| 4,693,109 | 9/1987 | Conner et al. . | |
| 4,776,197 | 10/1988 | Scott . | |
| 4,945,749 | 8/1990 | Walker et al. | 72/356 |
| 5,279,905 | 1/1994 | Mansfield, Jr. et al. | 29/623.5 |
| 5,296,317 | 3/1994 | Ratte et al. | 429/178 |
| 5,425,170 | 6/1995 | Spiegelberg et al. | 72/358 |
| 5,528,815 | 6/1996 | Webb | 29/243.5 |
| 5,662,717 | * 9/1997 | Burns | 29/623.1 |

FOREIGN PATENT DOCUMENTS

1033186  * 7/1953 (FR) ........................................ 72/357

* cited by examiner

Primary Examiner—Daniel C. Crane
(74) Attorney, Agent, or Firm—Russell H. Toye, Jr.; Robert W. Welsh

(57) ABSTRACT

A forming die includes a base and at least two die segments. At least a first one of the die segments is moveably mounted to the base for shifting between closed and opened positions. The die segments together define a cavity having an opening when the first die segment is in the closed position. A punch is moveably mounted to the base for shifting between a retracted position and an extended position wherein the punch crimps a part positioned within the cavity. A powered actuator is connected to at least the first one of the die segments, and shifts the first die segment between the closed and opened positions such that a part positioned within the cavity can be removed after crimping by shifting of the first die segment to the open position. The forming die is particularly well-suited for crimping electrochemical cells.

23 Claims, 8 Drawing Sheets

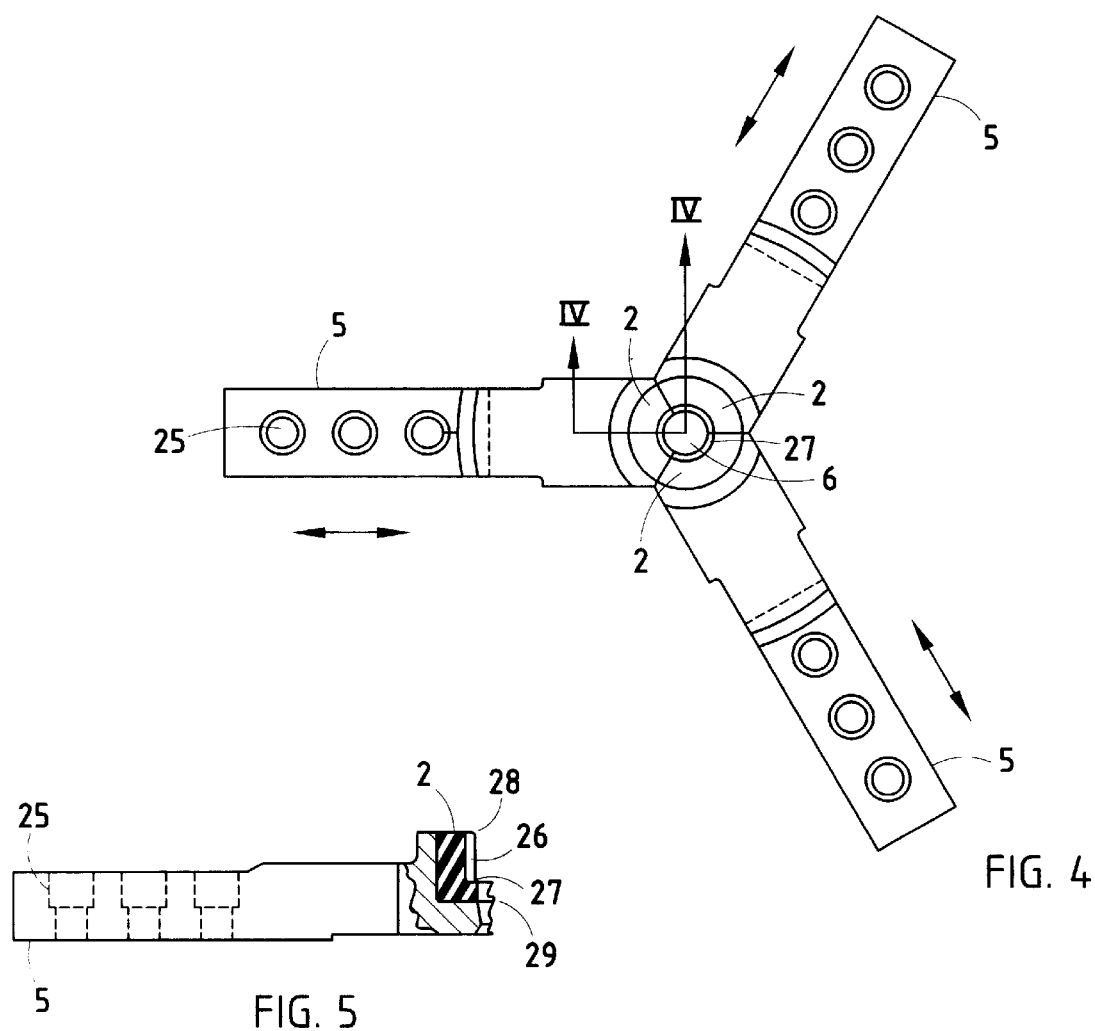
FIG. 4
FIG. 5
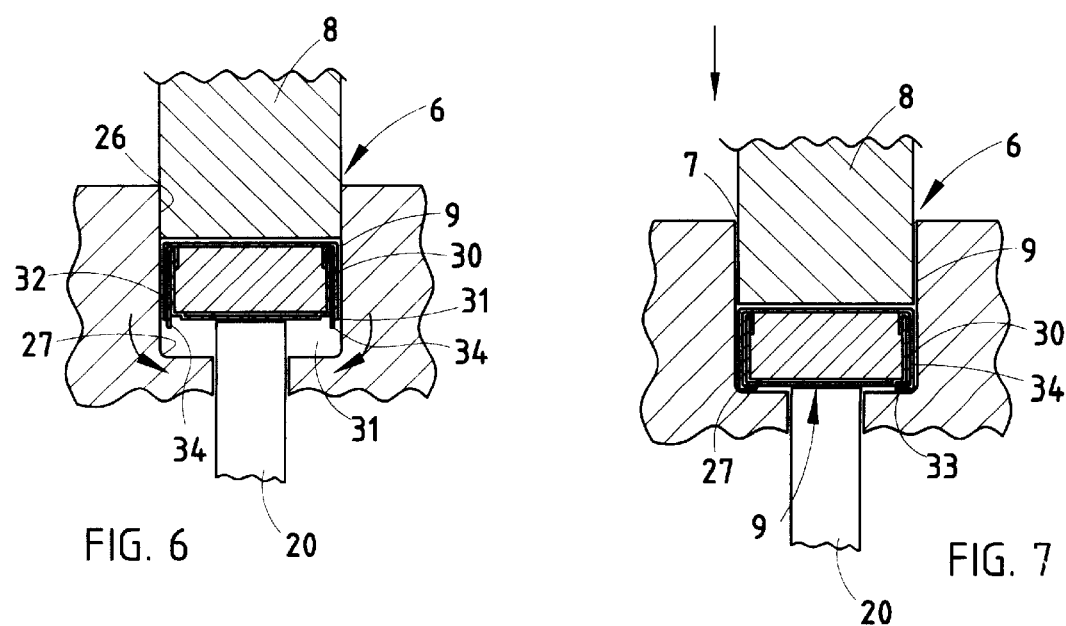
FIG. 6
FIG. 7

CRIMPING DIE EMPLOYING POWERED CHUCK

BACKGROUND OF THE INVENTION

The present invention relates to crimping dies and the like, and in particular to a crimping die that utilizes a powered chuck and segmented die to release a formed part.

Various types of metal forming dies have been used in the fabrication of a wide array of parts. One example is an electrochemical battery cell having a two piece cladding that is crimped together to form the finished battery cell. Known crimping methods utilize a one piece female die. A punch drives the two pieces of the cell into the female die segment, thereby deforming the outer edge of one of the cell pieces, and crimping the two sections together to form the electrochemical cell.

One problem encountered in such an arrangement is that the formed steel part will have some residual stress, causing the part to "spring" outwardly against the inner sidewalls of the female die segment. The friction generated between the part and the sidewalls of the female die segment can make removal of the formed cell difficult, leading to damage of the cell. Although lubricants may aid removal of the cell to some degree, such lubricants may lead to contamination of the cell. Even with lubrication it may not be possible to crimp the cell as tightly as desired and still permit removal of the cell without damage thereto, particularly for cells with thin sidewalls, such as miniature air cells.

A prior art segmented crimping die is shown in FIGS. 8 and 9A–9C. As shown in FIGS. 9A–9C, the prior art die includes a one-piece base support 101 having a bore 102 through which a lower punch 103 may be moved. Base plate 101 is generally fixed relative to the other parts. Base plate 101 further includes a recess 104 in which a one-piece crimp die 105 is disposed. Crimp die 105 also includes a central aperture through which lower punch 103 extends. The die further includes a tapered guide housing 106 disposed in fixed relation on base plate 101 and a top plate 107 mounted atop tapered guide housing 106. Tapered guide housing 106 includes a centrally disposed tapered opening 109 for receiving four segmented dies 108a–108d. As shown in FIG. 8, which is a top view of the four segmented dies, the four segmented dies together form annular side walls of the die and define a central opening through which an upper punch 111 and a battery 110 to be crimped may be moved. Top plate 107 also includes a centrally disposed hole of the same diameter for similarly allowing upper punch 111 and cell 110 to be moved therethrough. As shown, the four segmented dies are tapered and allowed to slide vertically along the tapered surface 109 of guide 106. In this matter, as the four segmented dies 108a–108d move vertically between the upper surface of the one-piece crimp die 105 and the lower surface of top plate 107, the four segmented dies move radially inward and outward to thereby increase/decrease the diameter of the centrally disposed aperture defined by the four segmented dies 108a–108d.

In operation, the die press is positioned with the four segmented dies 108a–108d in their lowermost position resting upon the upper surface of one-piece crimp die 105. A battery 110 is placed within aperture 112, and upper punch 111 is moved vertically downward to push the cell down against the curved portion of crimp die 105. Once the cell has been crimped, upper punch 111 is raised and lower punch 103 is moved vertically upward as shown in FIG. 9B to push the crimped battery upward through aperture 112. Because of the close tolerances with aperture 112 relative to the outer dimensions of the battery, the four segmented dies 108a–108d tend to move upward as the battery is lifted by lower punch 103. As the four segmented dies 108a–108d are lifted, they will move radially outward at the same time until their upper surfaces abut the stops on top plate 107. With the four segmented dies in their uppermost position, the diameter of aperture 112 is sufficient to freely remove battery 110 from the die apparatus.

A problem exists, however, in that some of the segmented dies 108a–108d may at times become hung up, as shown in FIG. 9C. Thus, when the next battery is inserted for crimping, the battery may become misaligned and a uniform crimping of the battery may not be obtained. A similar problem can occur during crimping, with one segment rising up independent of the other segments, due to the axial component of the radial stress on the angled surface, and thereby limiting the amount of radial stress that can be applied during crimping.

Accordingly, an apparatus and method for alleviating the above-identified problems would be desirable.

SUMMARY OF THE INVENTION

One aspect of the present invention is to provide a forming die including a base and at least two die segments. At least a first one of the die segments is moveably mounted to the base for shifting between closed and opened positions. The die segments together define a cavity having an opening when the first die segment is in the closed position. A punch is moveably mounted to the base for shifting between a retracted position and an extended position wherein the punch crimps a part positioned within the cavity. A powered actuator is connected to at least the first one of the die segments, and shifts the first die segment between the closed and opened positions such that a part positioned within the cavity can be removed after crimping by shifting of the first die segment to the open position.

Another aspect of the present invention is a forming die including a base and a pneumatic chuck. The pneumatic chuck has at least two powered jaws mounted to the base. The powered jaws are shiftable between extended and retracted positions. A die piece is mounted to each of the powered jaws, and the die pieces together define a die forming surface when the powered jaws are in the extended (closed) position. A punch is movably mounted to the base, and shifts to an extended position to form a part positioned against the die forming surface. The powered jaws shift to the retracted position to permit removal of a part from the forming die.

Yet another aspect of the present invention is a forming die including a base and a fluid actuated clamp. The clamp includes a chamber connectable to a source of pressurized fluid. The clamp also includes a flexible diaphragm in fluid communication with the chamber. A die assembly includes at least two die pieces, each of which is operably connected to the flexible diaphragm and shifts from an engaged position to a disengaged position upon pressurization of fluid within the chamber. Together, the die pieces define a die forming surface when in the engaged position. A punch is movably mounted to the base and shifts between a disengaged position away from the die forming surfaces, and an engaged position wherein the punch forms a part positioned in the die assembly. The die pieces shift to the disengaged position upon pressurization of fluid within the chamber to release a formed part for removal from the forming die.

Yet another aspect of the present invention is a method of crimping a deformable part. The method includes mounting die pieces on the jaws of a pneumatic chuck. The chuck is actuated to move the jaws into a clamped position such that the die pieces form a die cavity having sidewalls. A part positioned in the die cavity is punched to crimp the outer edge of the part along the sidewalls of the die cavity, and the chuck is actuated to move the jaws into a released position.

These and other advantages of the present invention will be further understood and appreciated by those skilled in the art by reference to the following written specification, claims, and appended drawings.

BRIEF DESCRIPTION OF THE DRAWINGS

FIG. 4 is a top elevational view of the die segments;

FIG. 5 is a partially fragmentary, front elevational view of the die segment of FIG. 4, taken along the line IV—IV;

FIG. 6 is a partially fragmentary, cross-sectional view illustrating the crimping of a part;

FIG. 7 is a partially fragmentary, cross-sectional view illustrating the crimping of a part;

DETAILED DESCRIPTION OF PREFERRED EMBODIMENTS

Figure 1:
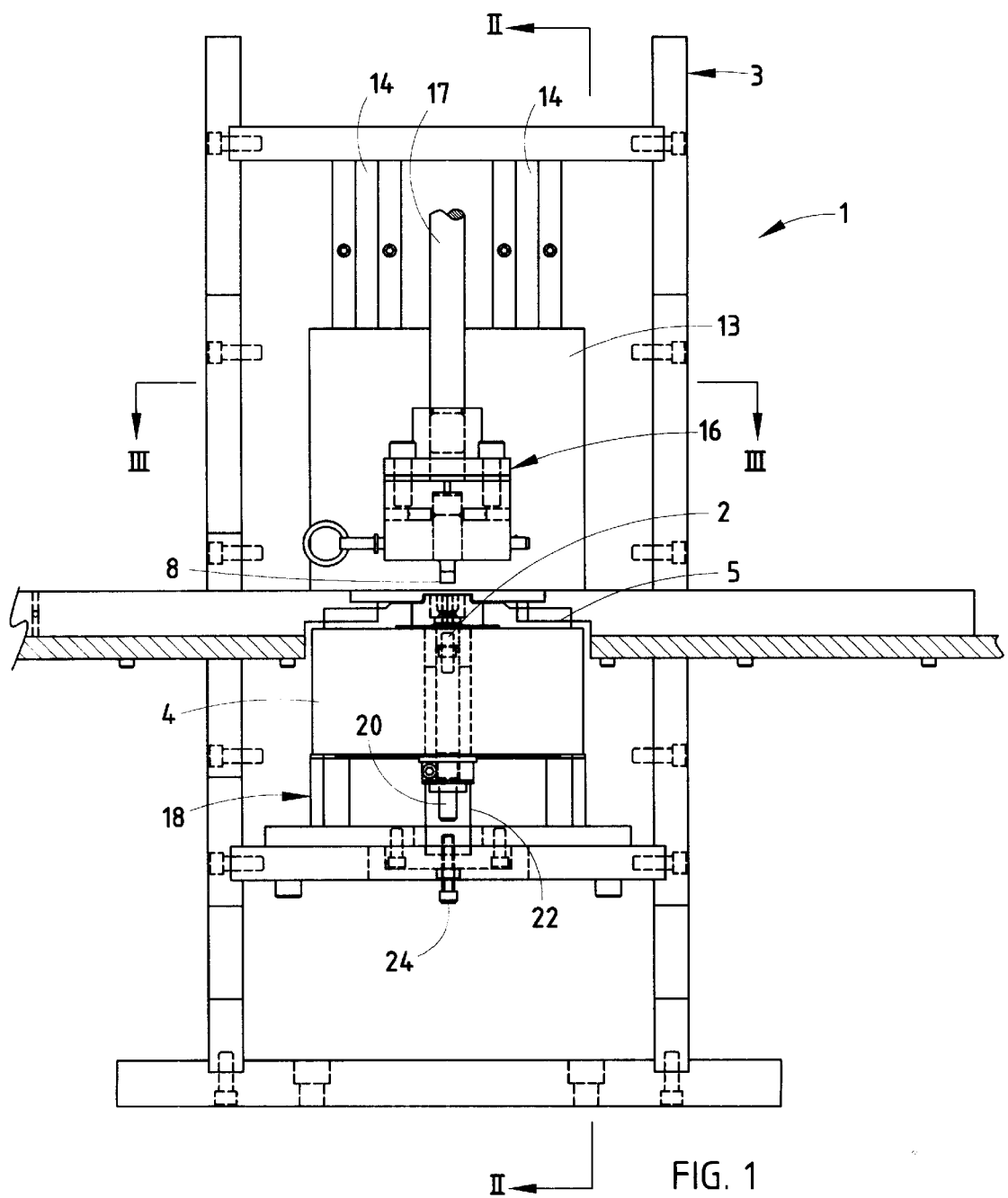
FIG. 1 is a partially fragmentary, front elevational view of a crimping die embodying the present invention, comprising an upper punch, and a lower segmented die utilizing an air chuck to release a crimped part.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a forming die embodying the present invention, which is particularly designed for forming electrochemical cells and the like, as by crimping. In the illustrated example, the forming die includes at least two die segments 2, at least a first one of which is movably mounted to a base or support structure 3 for shifting between closed and open positions.

In the illustrated example, the die segments 2 are mounted to the jaws 5 of a pneumatic, or "air" chuck 4. The die segments 2 together define a die cavity 6 (see also FIGS. 4–7) having an opening 7 when the die segments 2 are in the closed position. A punch 8 is moveably mounted to the base 3 for shifting between a retracted position and an extended position. In the extended position the punch 8 forces a part, such as a miniature electrochemical cell 9, into the walls of cavity 6 thereby crimping the cell. A powered actuator is connected to at least one of the die segments 2, and shifts the die segment 2 between the closed and opened positions, such that the electrochemical cell 9 positioned within the cavity 6 can be removed after crimping by shifting of the die segments 2 to the opened position.

Figure 2:
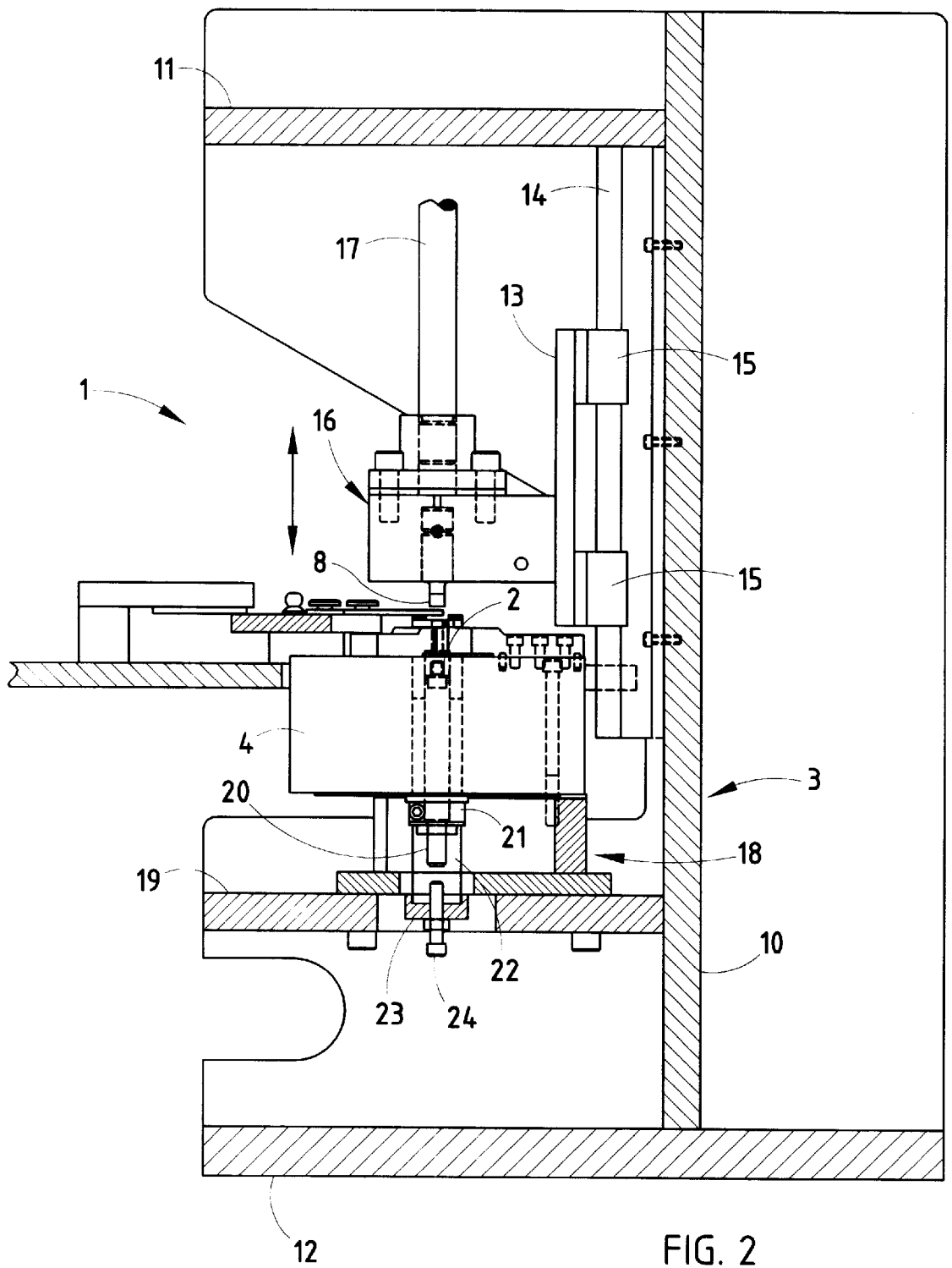
FIG. 2 is a cross-sectional view of the crimping die of FIG. 1, taken along the line II—II.
Figure 3:
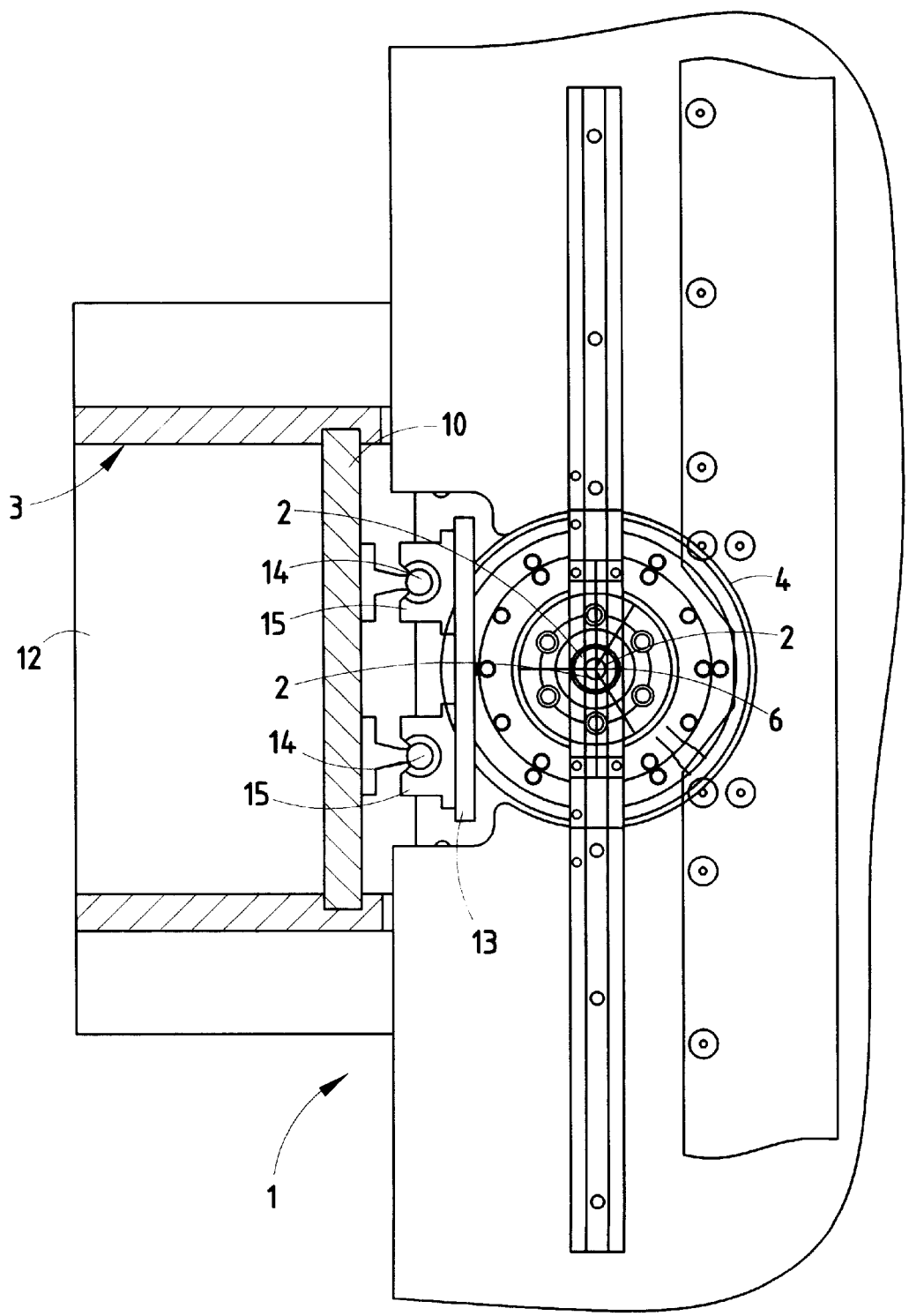
FIG. 3 is a cross-sectional view of the crimping die of FIG. 1, taken along the line III—III.
Figure 8:
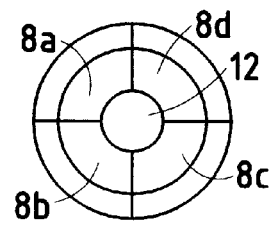
FIG. 8 is a partially schematic top plan view of a prior art segmented crimping die.
Figure 9A:
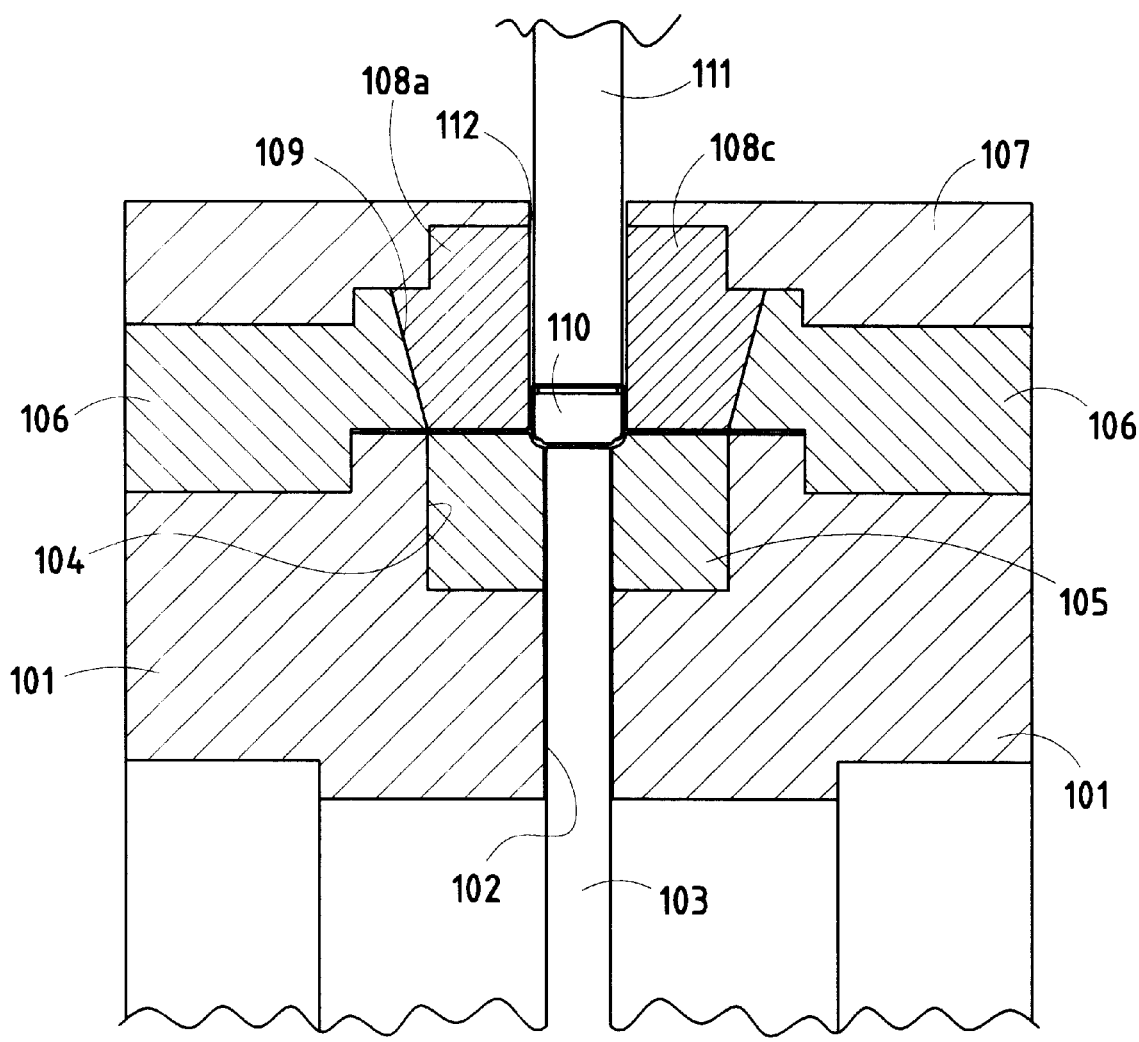
FIG. 9A is a partially fragmentary, cross-sectional view of the prior art crimping die of FIG. 8 taken along the line IXA—IXA.
Figure 9B:
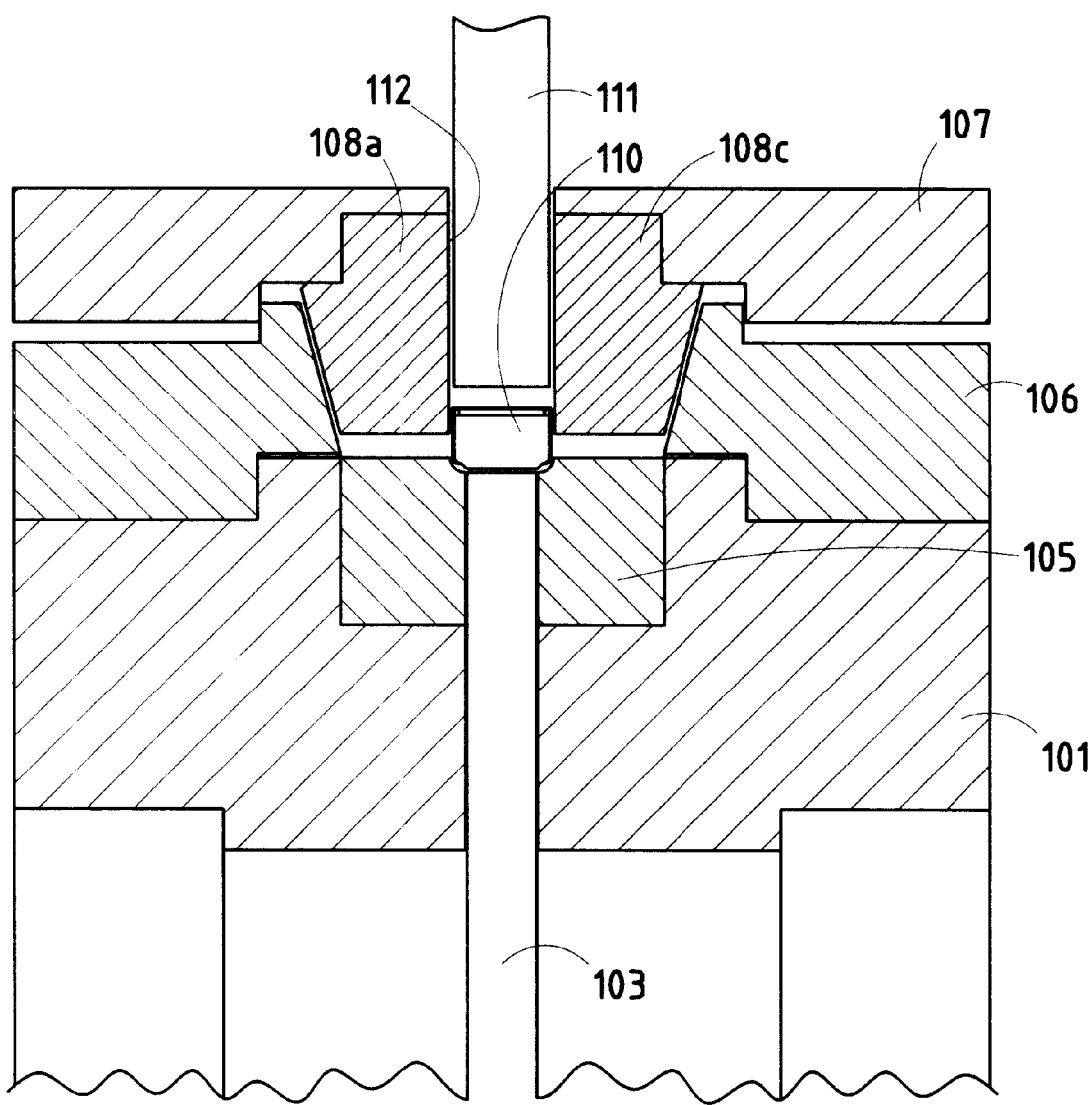
FIG. 9B is a partially fragmentary, cross-sectional view of the prior art segment die of FIG. 9A showing the segmented die in the open position.
Figure 9C:
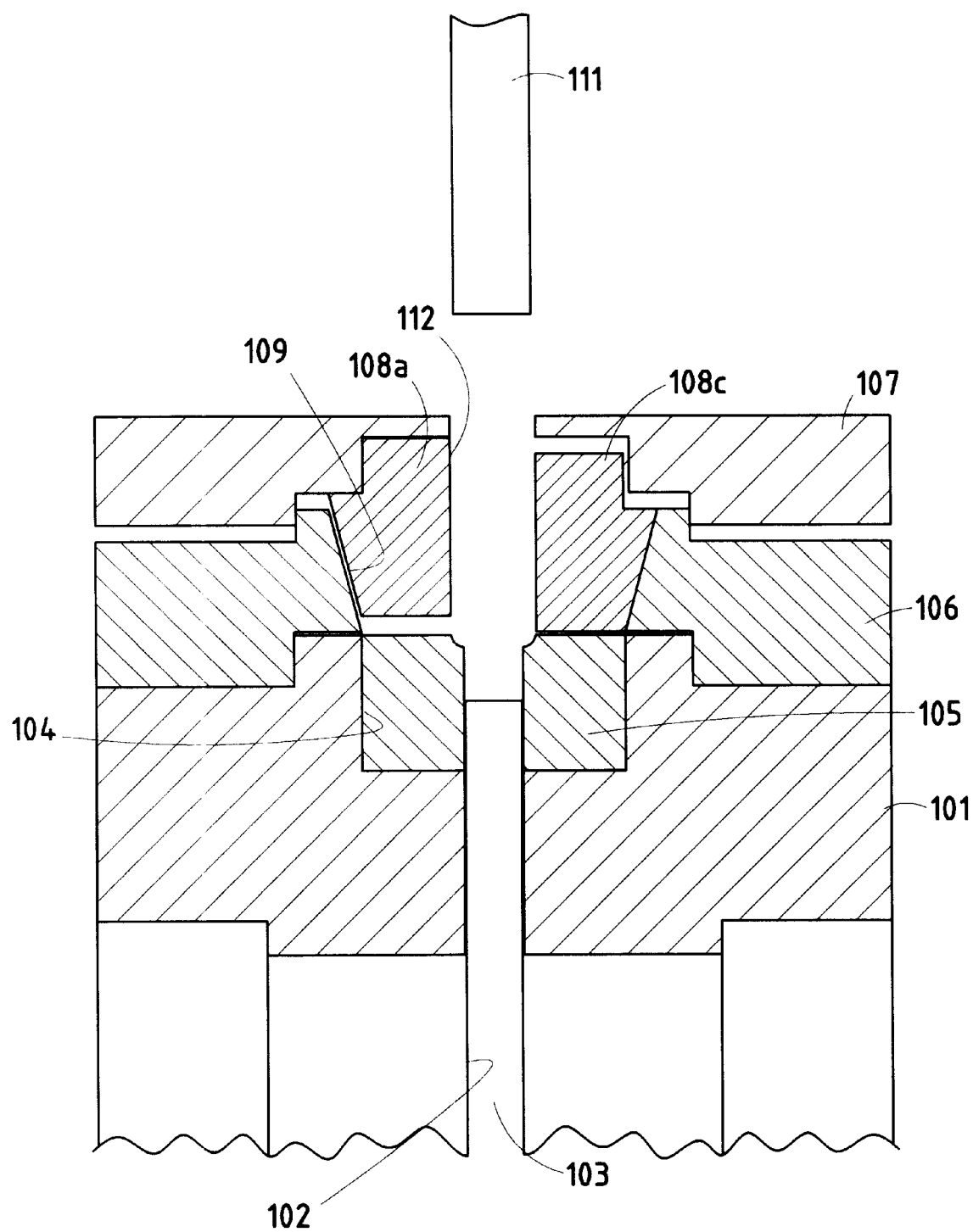
FIG. 9C is a partially fragmentary, cross-sectional view of the prior art crimping die of FIGS. 8 and 9 showing the upper punch in the raised position.

With reference to FIGS. 1, 2 and 3, the base 3 generally includes a vertical plate 10, and upper and lower horizontal plates 11 and 12, respectively. A bearing plate 13 is slidably mounted to the vertical plate 10 by a pair of vertical rods 14 and pillow blocks 15. A punch holder assembly 16 is secured to the bearing plate 13 by conventional fasteners or the like (not shown). The punch holder assembly 16 securely holds the punch 8 in alignment with the lower cavity 6 formed by the die segments 2. A rod 17 is secured to the punch holder assembly 16. Rod 17 is attached to an electric servo, hydraulic driver, or other powered actuator (not shown) having sufficient force to form the part 9 in the die cavity 6.

The electrochemical cells 9 are transferred to the die and crimped cells 9 are removed from the die after the forming operation. Any suitable mechanism, such as an index wheel, can be used for this purpose.

The pneumatic chuck 4 is securely supported on a horizontal plate 19 of the base 3 by a support assembly 18. A lower punch 20 is positioned below the pneumatic chuck 4. Punch 20 is slidably supported in alignment with the cavity 6 by a punch holder assembly 21. A spring 22 is supported by a stop block 23, and biases the lower punch 20 upwardly into the die cavity 6. An adjustable stop 24 is threadably received within the stop block 23, and limits the downward travel of the lower punch 20. As discussed in more detail below, spring 22 is relatively light weight, and lifts the formed electrochemical cell upwardly upon shifting of the die segments 2 to the opened, released position. With further reference to FIGS. 4 and 5, each die segment 2 is made of a suitable hardened tool steel, and includes a plurality of openings 25 to secure the die segment 2 to the jaws 5 of the pneumatic chuck 4. Each die segment 2 includes a sidewall 26 that is radiused, such that the die segments 2 together form a cylindrical die cavity 6. The upper portion 28 of the sidewall 26 is generally parallel to a vertical axis, and the lower portion 29 of the sidewall curves inwardly at radius 27.

With further reference to FIGS. 6 and 7, a standard electrochemical cell 9 includes a first metal casing portion 30 (also known as the "can") having a shape similar to an inverted cup. The electrochemical cell 9 also includes a second metal casing part 31 (also known as the "anode cup") that is also generally cup shaped. The part 31 has a slightly smaller diameter than part 30, such that part 31 fits inside part 30. A seal 34 fits between parts 30 and 31 and prevents electrical conduction between parts 30 and 31. The internal components 32 of the cell 9 are sandwiched between the first and second parts 30 and 31. During operation, an uncrimped electrochemical cell 9 is shifted into position at the upper portion of the die cavity 6. The electrochemical cell 9 is placed on the lower punch 20, which is in its uppermost position due to the upward bias of spring 22. The die segments are shifted into the extended, or closed, position by actuation of the pneumatic chuck 4. The upper punch 8 is then shifted downwardly by actuation of the electrochemical servo (not shown). As the upper punch 8 shifts downwardly, the uncrimped electrochemical cell 9 is pushed downwardly within the die cavity 6 until the electrochemical cell 9 is crimped on the radiused portion 27 of the die cavity 6. The die segments 2 are then shifted outwardly by actuation of the pneumatic chuck 4 into the unclamped, or open position. The powered ram and upper punch 8 are then shifted upwardly, with the lower punch 20 holding the crimped cell 9 against the upper punch 8. The die segments 2 are then shifted into the extended, or closed, position; the finished, crimped cell 9 is removed; and a new, uncrimped cell 9 is brought into the die. Alternatively, the die segments 2 could be in the open position when cell 9 is pushed into the die cavity and then closed to crimp the cell. However, this may leave undesirable marks, corresponding to the parting lines of die segments 2, on the crimped surface of cell 9.

Figure 10:
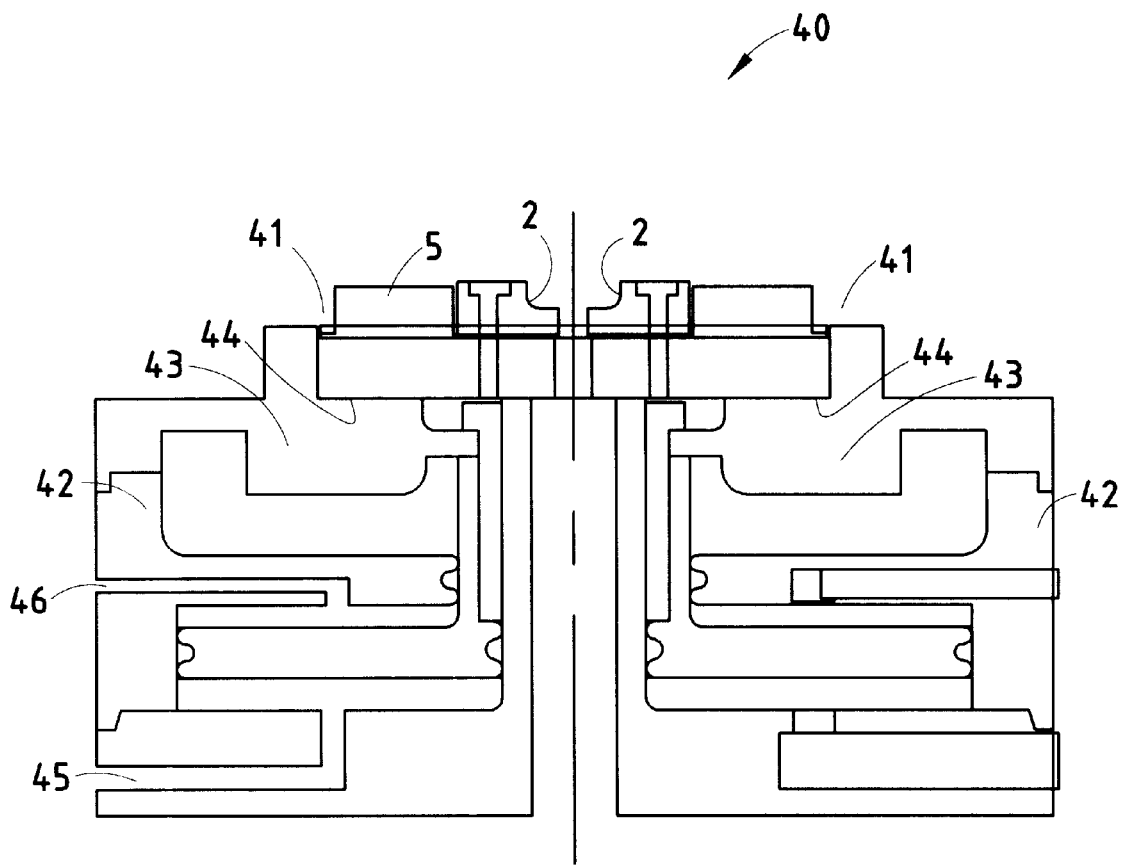
FIG. 10 is a schematic drawing of a membrane type air chuck.

In the illustrated example described above, the die segments 2 are mounted to a pneumatic chuck 4. A preferred pneumatic chuck is a five-inch diaphragm chuck available from Northfield Precision Instrument Corporation of Island Park, N.Y. A membrane air chuck 40 is shown schematically in FIG. 10. Peripheral portions 41 of the jaws 5 are mounted to a peripheral base 42 via a flexible diaphragm 43. When compressed air is introduced into air passageway 45, a resulting force is applied to the lower side 44 of the jaws 5 by the chuck. This causes jaws 5 and attached die segments 2 to pivot upward and outward to the open position. When compressed air is introduced into air passageway 46, the jaws 5 are moved to the closed position. Other pneumatic chucks may also be used. For example, a six-inch air chuck, model no. 6-120NR-3, available from MicroCentric Corporation of Plainview, N.Y., may be used. As illustrated in FIG. 3, jaws 5 of this type of chuck are mechanically driven radially inward and outward, to the closed and opened positions respectively. It is anticipated that other types of powered actuators could be connected to one or more of the die segments 2 to permit shifting of the die segments for release of the crimped cell. For example, the die segments 2 could be movably mounted to the base by a conventional slide arrangement, with an electrochemical, pneumatic, or other powered actuator connected to the movable die segment(s) for shifting between closed and open positions. Die segments 2 may be mounted to jaws 5 by any suitable means, such as bolting, screwing, welding, clamping, pinning, gluing and so on; or die segments 2 may be an integral part of jaws 5. It is also anticipated that other types of flexible members could be used instead of a flexible diaphragm. For example, each die segment could be biased by one or more separate flexible members. Because die segments 2 are fastened to jaws 5, undesirable vertical movement of die segments 2 is prevented.

The forming die of the present invention facilitates removal of the finished electrochemical cell, without damage of the cell, or contamination by lubricants or the like. Furthermore, the diameter of the cylindrical die cavity 6 can be made smaller relative to the part being formed, thereby permitting a tighter crimp of the electrochemical cell 9, yet still permitting removal of the crimped cell without damage.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A forming die, comprising:

a base;

at least two die segments, at least a first one of which is movably mounted to said base for shifting between closed and open positions, said die segments together defining a cavity having an opening when said first die segment is in said closed position, said cavity having a cylindrical portion with a radiused portion at one end thereof for crimping a part having a circular edge;

a punch movably mounted to said base for shifting between a retracted position and an extended position wherein said punch pushes against a part positioned within said cavity, thereby causing the part to be crimped by inward bending of the circular edge of the part; and a powered actuator directly connected to at least the first one of said die segments and shifting said first die segment between said closed and open positions without sliding contact on a tapered surface such that a part positioned within said cavity can be removed after crimping by shifting of the first die segment the open position.

2. The forming die set forth in claim 1, wherein:

said powered actuator comprises a pneumatic chuck having at least two powered jaws actuated by pneumatic pressure, each of said powered jaws having one of said die segments mounted thereon.

3. The forming die set forth in claim 1, wherein:

said die cavity has a sidewall surface defining a generally cylindrical shape.

4. A forming die, comprising:

a base;

at least two die segments, at least a first one of which is movably mounted to said base for shifting between closed and open positions, said die segments together defining a cavity having an opening when said first die segment is in said closed position;

a punch movably mounted to said base for shifting between a retracted position and an extended position wherein said punch pushes against a part positioned within said cavity, thereby causing the part to be crimped;

a powered actuator connected to at least the first one of said die segments and shifting said first die segment between said closed and open positions such that a part positioned within said cavity can be removed after crimping by shifting of the first die segment to the open position;

said powered actuator comprises a pneumatic chuck having at least two powered jaws actuated by pneumatic pressure, each of said powered jaws having one of said die segments mounted thereon, and wherein:

said pneumatic chuck is a three-jaw air chuck.

5. The forming die set forth in claim 4, wherein:

said pneumatic chuck includes a diaphragm operably connected to said jaws for shifting said die segments between said open and closed positions.

6. A forming die, comprising:

a base;

at least two die segments, at least a first one of which is movably mounted to said base for shifting between closed and open positions, said die segments together defining a cavity having an opening when said first die segment is in said closed position;

a punch movably mounted to said base for shifting between a retracted position and an extended position wherein said punch pushes against a part positioned within said cavity, thereby causing the part to be crimped;

a powered actuator connected to at least the first one of said die segments and shifting said first die segment between said closed and open positions such that a part positioned within said cavity can be removed after crimping by shifting of the first die segment to the open position, and wherein:

said powered actuator includes a flexible member and a chamber on a first side of said member, said die segments mounted on a second side of said member, said member flexing upon pressurization of said chamber to shift said die segments to said open position.

7. A forming die, comprising:

a base;

a pneumatic chuck having at least three powered jaws movably mounted to said base, said powered jaws shiftable between extended and retracted positions;

a die piece mounted to each of said powered jaws, said die pieces together defining a die forming surface shaped to bend the circular periphery of a part when said powered jaws are in said extended position;

a punch movably mounted to said base and shiftable to an extended position to form a part positioned against said die forming surface; and said powered jaws shiftable to the retracted position to permit removal of a part from the forming die.

8. The forming die of claim 7, wherein:

said die forming surfaces have a cylindrically shaped portion with a taper at one end thereof.

9. The forming die of claim 7, wherein:

said die forming surface forms a die cavity having a generally cylindrical shape with openings at opposite ends thereof.

10. A forming die, comprising:

a base;

a pneumatic chuck having at least two powered jaws mounted to said base, said powered jaws shiftable between extended and retracted positions;

a die piece mounted to each of said powered jaws, said die pieces together defining a die forming surface when said powered jaws are in said extended position;

a punch movably mounted to said base and shiftable to an extended position to form a part positioned against said die forming surface;

said powered jaws shiftable to the retracted position to permit removal of a part from the forming die, and wherein:

said pneumatic chuck has at least three jaws, each having a die piece mounted thereon.

11. A forming die, comprising:

a base;

a pneumatic chuck having at least two powered jaws mounted to said base, said powered jaws shiftable between extended and retracted positions;

a die piece mounted to each of said powered jaws, said die pieces together defining a die forming surface when said powered jaws are in said extended position;

a punch movably mounted to said base and shiftable to an extended position to form a part positioned against said die forming surface;

said powered jaws shiftable to the retracted position to permit removal of a part from the forming die;

said die forming surface forms a die cavity having a generally cylindrical shape with openings at opposite ends thereof;

said punch comprises a first punch that enters a first one of said openings of said die cavity to form a part positioned therein, and including:

a second punch that shifts into a second one of said openings to eject a formed part.

12. The forming die of claim 11, wherein:

said cavity tapers inwardly adjacent said second end.

13. The forming die of claim 12, including:

a powered actuator connected to said first punch for shifting said first punch between extended and retracted positions.

14. A forming die, comprising:

a base;

a fluid actuated clamp including a chamber, connectable to a source of pressurized fluid, and a flexible member communicating with said chamber, such that said flexible member moves in response to changes of pressure within said chamber;

a die assembly including at least two die pieces, each of which is operably connected to said flexible member for shifting from a disengaged position to an engaged position upon pressurization of fluid within said chamber, said die pieces defining a die forming surface when in said engaged position; and a punch movably mounted to said base and shifting between a disengaged position away from said die forming surfaces, and an engaged position wherein said punch pushes a part positioned in said die assembly, such that the part is formed by said die forming surfaces said die pieces shiftable to said disengaged position upon pressurization of fluid within said chamber to release a formed part for removal from the forming die.

15. The forming die set forth in claim 14, wherein:

said die forming surface forms a die cavity having a generally cylindrical shape with first and second open ends and an inwardly tapering portion adjacent said second open end.

16. The forming die set forth in claim 15, including:

a second punch movably mounted to said base and engagable with said second open end to eject a formed part from said die cavity.

17. The forming die set forth in claim 16, wherein:

said flexible member is configured to rotate said die pieces upon pressurization of said chamber.

18. The forming die set forth in claim 14, wherein:

said fluid actuated clamp includes three jaws, said die pieces mounted on said jaws.

19. The forming die set forth in claim 14, wherein:

said flexible member is a diaphragm.

20. A method of crimping an electrochemical cell having a sidewall forming a circular outer edge, comprising:

mounting die pieces on the jaws of a powered chuck;

actuating the chuck to move the jaws into a clamped position such that said die pieces form a die cavity having sidewalls;

punching an electrochemical cell in the die cavity to crimp the outer edge of the part along the sidewalls of the die cavity by bending said sidewalls inwardly; and actuating the chuck to move the jaws into a released position.

21. The method set forth in claim 20, wherein:

said powered chuck is a pneumatic chuck.

22. The method set forth in claim 20, wherein:

said electrochemical cell has a metal casing, an anode cup, and a seal that is tightly crimped between said metal casing and said anode cup upon crimping of said electrochemical cell.

23. A method of crimping a deformable part, comprising:

mounting die pieces on the jaws of a powered chuck;

actuating the chuck to move the jaws into a clamped position such that said die pieces form a die cavity having sidewalls;

punching a part in the die cavity to crimp the outer edge of the part along the sidewalls of the die cavity;

actuating the chuck to move the jaws into a released position, and wherein:

actuation of the powered chuck includes deforming a flexible member.

* * * * *